US007941790B2

(12) United States Patent
Cabillic et al.

(10) Patent No.: US 7,941,790 B2
(45) Date of Patent: May 10, 2011

(54) DATA PROCESSING APPARATUS, SYSTEM AND METHOD

(75) Inventors: Gilbert Cabillic, Noyal Chatillon sur Seiche (FR); Jean-Philippe Lesot, Etrelles (FR); Michel Banatre, La Fresnais (FR); Gerard Chauvel, Antibes (FR); Dominique D'Inverno, Villeneuve-Loubet (FR); Teresa Higuera, Paris (FR); Valerie Issarny, Houilles (FR); Serge Lasserre, Frejus (FR); Frederic Parain, Rennes (FR); Jean-Paul Routeau, Thorigne Fouillard (FR)

(73) Assignee: Texas Instruments Incorporated, Dallas, TX (US)

( * ) Notice: Subject to any disclaimer, the term of this patent is extended or adjusted under 35 U.S.C. 154(b) by 1437 days.

(21) Appl. No.: 10/003,570

(22) Filed: Oct. 24, 2001

(65) Prior Publication Data

US 2003/0079213 A1 Apr. 24, 2003

(30) Foreign Application Priority Data

Nov. 29, 2000 (EP) .................................. 00403344

(51) Int. Cl.
*G06F 9/45* (2006.01)
(52) U.S. Cl. ...................................... 717/139; 717/137
(58) Field of Classification Search ........... 717/136–139
See application file for complete search history.

(56) References Cited

U.S. PATENT DOCUMENTS

| 5,101,346 A | | 3/1992 | Ohtsuki | |
|---|---|---|---|---|
| 5,586,323 A | * | 12/1996 | Koizumi et al. | 717/174 |
| 6,230,307 B1 | * | 5/2001 | Davis et al. | 716/16 |
| 6,438,737 B1 | * | 8/2002 | Morelli et al. | 716/16 |
| 6,453,456 B1 | * | 9/2002 | Price | 716/16 |
| 6,539,438 B1 | * | 3/2003 | Ledzius et al. | 710/8 |
| 6,571,388 B1 | * | 5/2003 | Venkatraman et al. | 717/166 |
| 6,625,797 B1 | * | 9/2003 | Edwards et al. | 716/18 |
| 6,631,508 B1 | * | 10/2003 | Williams | 716/8 |
| 6,725,441 B1 | * | 4/2004 | Keller et al. | 716/16 |

FOREIGN PATENT DOCUMENTS

| EP | 1 046 985 A2 | 10/2000 |
|---|---|---|
| EP | 1 049 010 A | 11/2000 |

OTHER PUBLICATIONS

Joch, Alan; "ITworld.com—Compilers, Interpreters and Bytecode", <URL: www.itworld.com/AppDev/400/CWD012201Compilers44k-Sep 6,2004->, retrieved Aug. 30, 2004.*
Loyot, Edmond C; Grimshaw, Andrew S.' "VMPP: A Virtual Machine for Parallel Porcessing", p. 735-740, IEEE Apr. 1993, retrieved Aug. 30, 2004.*
Ma, Perng-Yi; Lewis, T.G.; "Design of a Machine-Independent Optimizing System for Emulator Development", p. 239-262, ACM 1980, retrieved Aug. 30, 2004.*
Ung, David; Cifuentes, Cristina; "Machine-Adaptable Dynamic Binary Translation", p. 41-51, ACM Jan. 2000, retrieved Aug. 30, 2004.*
Smith et al., "Distributed Programming with Intermediate IDL", Jun. 1999, Ada Letters, col. XIX, No. 2, pp. 90-95.*
Kazi et al., "Techniques for Obtaining High Performance in Java Programs", Sep. 2000, ACM, pp. 213-240.*

* cited by examiner

*Primary Examiner* — Ted T Vo
(74) *Attorney, Agent, or Firm* — Ronald O. Neerings; Wade James Brady, III; Frederick J. Telecky, Jr.

(57) ABSTRACT

A method for generating program code for translating high level code into instructions for one of a plurality of target processors comprises first determining a desired program code characteristic corresponding to a target processor. Then, selecting one or more predefined program code modules from a plurality of available program code modules in accordance with said desired program code characteristic, and generating program code for translating high level code into instructions for said target processor from said selected one or more predefined program code modules. Preferably, the method comprises forming agglomerated program code from a plurality of program code modules in accordance with said desired program code characteristic.

22 Claims, 4 Drawing Sheets

| | INTEL PENTIUM II | | | | TI DSP C55X | | |
|---|---|---|---|---|---|---|---|
| | LANGUAGE | CYCLE | MEMORY | | LANGUAGE | CYCLE | MEMORY |
| SWITCH THREADED RATIO | ANSIC GNUC | 162 132 19% | 20 80 400% | SWITCH THREADED RATIO | ANSIC C/ANSI | 294 183 62% | 40 80 200% |
| | | | | SWITCH SWITCH-2 RATIO | ANSIC ANSIC | 294 622 211% | 40 20 50% |

FIG. 4

| MODULE | DESCRIPTION |
|---|---|
| ARITHMETIC | |
| INTEGER | REPRESENTATION, OPERATIONS AND CONVERSION OF JAVA INT |
| LONG | REPRESENTATION, OPERATIONS AND CONVERSION OF JAVA LONG |
| FLOAT | REPRESENTATION, OPERATIONS AND CONVERSION OF JAVA FLOAT |
| DOUBLE | REPRESENTATION, OPERATIONS AND CONVERSION OF JAVA DOUBLE |
| JAVA FRAME | |
| LOCAL | LOCAL VARIABLES MANAGEMENT AND ACCESS |
| STACK | STACK MANAGEMENT AND ACCESS |
| CONTROL FLOW | |
| MOTOR | INTERPRETATION ENGINE |
| BRANCH | BRANCHING AND SUBROUTINE |
| EXCEPTION | EXCEPTION MANAGEMENT AND BRANCHING |
| OBJECT | |
| OBJECT | REPRESENTATION AND OPERATIONS ON OBJECT AND REFERENCE |
| FIELD | REPRESENTAION OF 'SMALL' TYPE AND FIELD ACCESS |
| ARRAY | REPRESENTATION AND OPERATIONS ON ARRAY AND ELEMENT |
| METHOD | METHOD INVOCATION AND PARAMETERS PASSING |
| INTERFACE | INTERFACE MANAGEMENT |
| STRING | INTERNAL STRING AND JAVA STRING REPRESENTATION |
| CLASS | |
| CIREPOS | CLASS REPOSITORY |
| LOAD | CLASS LOADER MANAGER |
| MISCELLANEOUS | |
| JNI | JAVA NATIVE INTERFACE SUPPORT |
| THREAD | THREAD AND MONITOR SUPPORT |

# DATA PROCESSING APPARATUS, SYSTEM AND METHOD

FIELD OF THE INVENTION

The present invention relates to a data processing apparatus, system and method for generating program code for translating high level code into instructions for one or more target processors and, separately, to a data processing apparatus system and method for running such program code. In particular, but not exclusively, the program code forms a virtual machine, for example a JAVA software virtual machine, for the one or more target processors.

BACKGROUND OF THE INVENTION

It is becoming more and more common for a variety of appliances and electronic goods to include processing devices embedded within them to provide a high level of functionality for the appliance. For example, embedded processing devices may be found in such disparate appliances as mobile 'phones, TV set top boxes, pagers, coffee makers, toasters, in-car systems, vehicle management control systems and personal digital assistants (PDAs), to name but a few. The market for embedded processing devices is growing extremely fast, in particular new applications and hardware architectures are appearing on an almost daily basis.

With regard to applications, multi-media applications are now necessary for wireless devices, set-top boxes or screen 'phones, amongst other things. Moreover, wireless products have introduced a need for new kinds of applications such as new communication protocols (UMTS), ad hoc networks or neighbourhood interaction protocols based on blue tooth technology, for example. Other applications will be readily recognised by the ordinarily skilled person.

Furthermore, hardware architectures for embedded processing devices are constantly being developed since there is an increasing need for computation capacity, as well as other requirements such as safety-critical systems, autonomy management and power saving features.

Another feature of embedded devices is that they are often one of a plurality of processing devices which form an embedded processing system. Such embedded systems are useful for complex applications such as multi-media applications.

In order to aid application development, and to re-use applications to run on different host processors, it is desirable that the application code is transportable between different host processors. This provides for re-use of whole applications, or parts thereof, thereby increasing the speed of development of applications for new processors and indeed increasing the speed of development of new applications themselves. This may be achieved by means of program code which runs on a host processor and is capable of translating high level program code into operation code or instructions for the host processor. The program code provides a virtual machine for a host processor, enabling it to implement application software written in an appropriate high level language. An example of such translating program code is the JAVA software programming language developed by Sun Microsystems, Inc. (JAVA is a trademark of Sun Microsystems, Inc). Such program code, when running on an appropriate host processor is known as a JAVA software Virtual Machine.

Although examples of embodiments of the present invention will be described with reference to JAVA software and JAVA software Virtual Machines, embodiments in accordance with the invention are not limited to the JAVA programming language but may be implemented using other suitable programming languages for forming virtual machines.

A feature of a virtual machine is that it provides for the dynamic loading of applications onto embedded processing systems. This is an extremely useful feature. Typically, applications are already embedded within a processing system. It is difficult to dynamically download an application or to patch an existing application onto an embedded processing device. However, virtual machines, such as JAVA software enabled, provide the possibility of enabling dynamic loading of a complete application that could be written by a third party and available on a remote server, for example. Moreover, distribution and maintenance costs are reduced since it is possible to dynamically interact with the embedded system via the virtual machine. Due to JAVA software application program interfaces APIs standardisation, the configuration and the profiles, reference [1], for compatibility of applications can be ensured if the JAVA software platform on the embedded system is compliant with the standardisation.

Security features are also available within JAVA software to identify a trusted code which is dynamically downloaded through a network and to preserve the availability of the embedded system.

Another feature of JAVA software is that the hardware architecture heterogeneity management may be masked. A major advantage of such a feature is that it reduces the software development costs of an application. Embedded processors typically are highly diverse and have specific capabilities and capacities directed to the needs of the system or appliance in which they are embedded. This would generally give rise to a high cost of application development. However, because of the portable nature of JAVA software code between JAVA software Virtual Machines, the cost of integrating a new hardware architecture, for example, merely relies on developing a new JAVA software Virtual Machine. Another important feature is that the transparent exploitation of a multi-processor architecture can be achieved by a JAVA software Virtual Machine, without any change of the application code.

Two known JAVA software virtual machines are the JWORKS [6] and KVM, the JAVA software virtual machine of J2MF [7]. JWORKS is part of personal JAVA software virtual machine distribution on VXWORKS real-time operating systems. As VXWORKS is designed to be integrated on a large range of hardware platforms and because JWORKS is, at least from the operating system point of view, an application respecting VXWORKS APIs, JWORKS could be executed on a large range of hardware platforms. Nevertheless, the integration of JWORKS on a new embedded system is limited to the VXWORKS porting ability, without any consideration of the JAVA software virtual machine. However, as will be described in detail later, a JAVA software virtual machine must take care of many different aspects. In light of this, JWORKS is unable to provide the best trade-off for a dedicated embedded system, since it does not take into account the different requirements of target host processors in the embedded system.

J2ME is a Sun Java platform for small embedded devices. KVM is the JAVA software virtual machine of J2ME. It supports 16 and 32 bits CISC and RISC processors, and generates a small memory footprint and can keep the code in a memory area of about 128 KB. It is written for a ANSI C compiler with the size of basic types well defined (e.g. character on 8 bits, long on 32 bits). This is why it is difficult to port the KVM onto another compiler (for example the TI DSP C55x C family compilers support characters on 16 bits), without rewriting all the JAVA software virtual machines. Additionally, an optional data alignment can only be obtained for 64 bit data. Other alignments are handled by the C compiler. Moreover, there is no possibility to manage a heterogeneous multiprocessor without re-writing C structures (due to data representation conversion). It is also not possible to tune a trade-off between memory and access costs without re-writing substantially all the parts of the JAVA software virtual machine.

A problem with the increasing development of new hardware architectures for embedded devices is that it is necessary to continually develop new virtual machines for the new devices. In principle, a virtual machine designed to run in accordance with a particular operating system might well be capable of being used on different host processing devices utilising that operating system, it is generally the case that the different generations of hardware architecture mean that a virtual machine for one processor is not optimised for another host processing device. Consequently, in order to provide the greatest capabilities and efficiencies from a host processor, a virtual machine needs to be designed for each target processor. This increases the cost and delays incorporating new processing devices into embedded systems.

SUMMARY OF THE INVENTION

Viewed from one aspect, the present invention teaches how to build a virtual machine (JAVA software Virtual Machine) which may be compatible for several embedded systems. In this regard, the Virtual Machine comprises program code modules, each module providing a particular function and optimised for a particular host processor.

Viewed from another aspect, the invention teaches and provides an environment for designing a virtual machine in a modular manner, to permit its adaptation to a plurality of processing devices and, therefore, embedded systems, by taking into account several criteria such as memory size, available processor facilities and functions or performance issues.

A virtual machine in accordance with, or designed in accordance with, the foregoing provides for the prompt and speedy development of virtual machines optimised for one, or possibly more than one, target host processor in order to achieve an optimum trade-off between all the different components of the embedded system.

In accordance with one aspect of the present invention, there is provided a method for generating program code for translating high level code into instructions for a target processor, the method comprising:
 determining a program code characteristic in accordance with a target processor;
 deriving one or more program code modules in accordance with said program code characteristic; and
 generating program code for translating high level code into instructions for said target processor from said one or more program code modules.

Such program code may be generated from an agglomeration of said plurality of program code modules.

In another aspect, the present invention provides a software tool for creating program code for translating between high level code and instructions for a target processor, comprising software tool elements for:
 determining a program code characteristic in accordance with a target processor;
 deriving one or more program code modules in accordance with said program code characteristic; and
 forming program code for translating high level code into instructions for said target processor from said one or more program code modules.

A method or software tool in accordance with the foregoing advantageously generates modular program code for translating high level code into instructions for a target processor. Thus, modules can be derived separately, and optimised separately for the target processor.

Suitably, deriving one or more program modules is achieved by selecting one or more predefined program code modules in accordance with the program code characteristic from a plurality of available predefined program code modules.

A method or software tool in accordance with the foregoing paragraph provides the advantage that program code for translating high level code into instructions for a target processor, i.e. a virtual machine, may be easily developed by using suitable program code modules from a library of program code modules. This obviates the need for a virtual machine to be desired from scratch for each net target host processor, thereby speeding up development of such virtual machine. Furthermore, because code is being re-used there are likely to be fewer problems or bugs in the program code for the new virtual machine, thereby increasing its robustness.

Preferably, the selection of said desired program code modules is in accordance with a desired functionality for said target processor. Thus, program code modules are selected in order to create a virtual machine capable of supporting and optimising particular functions for an application to be run on the target processor.

In yet another aspect of the invention, there is provided data processing apparatus for creating program code for translating between high level code and instructions for a target processor, the data processing apparatus being configured to:
 determine a program code characteristic in accordance with a target processor identifier input to said data processing apparatus;
 derive one or more program code modules in accordance with said program code characteristic; and
 create program code for translating high level code into instructions for said target processor from said one or more program code modules. Such data processing apparatus provides a suitable environment for implementing the method and/or software tool as described in the foregoing paragraphs.

In a preferred embodiment, respective program code characteristics are determined for respective ones of a plurality of target processors, program code modules are derived in accordance with said respective program code characteristics, and program code for translating high level code into instructions for said target processors is generated from said program code modules.

Suitably, program code is generated for translating high level code into instructions for one of a plurality of target processors.

An advantage of the preferred embodiment is that program code can be generated capable of operating for more than one target processor, yet comprising individual modules for respective target processors thereby providing for optimisation of modules, and hence the program codes for individual target processors.

In a still yet another aspect of the invention, there is provided program code comprising at least one program code module of a plurality of program code modules for translating between high level code and instructions for a target processor, said at least one program code module being in accordance with a characteristic of said target processor and selected from said plurality of program code modules.

The program code may comprise at least two program code modules for translating between high level code and instructions for respective ones of at least two target processors.

Typically, the program code comprises an agglomeration of two or more program code modules.

In a still yet further aspect of the invention, there is provided a processor, configured in accordance with program code comprising at least one program code module of a plurality of program code modules, for translating between high level code and instructions for a target processor, said at least one program code module being selected from said plurality of program code modules in accordance with a characteristic of said target processor.

Typically, the processor is configured by program code comprising an agglomeration of two or more program code modules of said plurality of said program code modules.

In a still yet further aspect of the invention there is provided a system comprising a first and second processor, said first and second processor configured in accordance with program code comprising at least two program code modules, wherein a first of said at least two program code modules is arranged to translate high level code to instructions for said first processor and a second of said at least two program code modules is arranged to translate high level code to instructions for said second processor.

Embodiments of the present invention provide development of virtual machines, for example JAVA software virtual machines using modular adaptability such that it is possible to support in a straight forward manner any kind of data representation on a target processor or processors. Additionally, language mapping can be added to the development environment for supporting different compilers. Furthermore, each module can define its own data alignment as well as also introducing transparent data representation conversion to support heterogeneous architecture. The user memory may also be optimised.

Embodiments in accordance with the present invention provide a new methodology and apparatus to design and implement a virtual machine for embedded systems, in particular systems including different processors. The methodology based on modularity specification and implementation in accordance with aspects of the invention provide a flexibility in design possibilities with regard to a particular module without needing to reconsider the implementation of the other modules. Modularity also facilitates the adaptation of a virtual machine for other embedded systems.

Embodiments of the present invention are distinguished from conventional porting of virtual machines onto different hardware since porting of a virtual machine does not give the best results for a new or multi-processor since the trade-off between performance, memory and energy are best specific to a target processor. Advantageously, the modular approach of embodiments of the present invention permit the adaptation of each module of the virtual machine and experimentation for each one, in order to evaluate whether the trade-off is acceptable from the point of view of the virtual machine design criteria.

Particular preferred aspects of the invention are set out in the accompanying independent claims. Combinations of features from the dependent and/or independent claims may be combined as appropriate, not merely as set out in the claims.

BRIEF DESCRIPTION OF THE DRAWINGS

Preferred embodiments in accordance with the present invention will now be described, by way of example only, and with reference to the accompanying drawings, in which:

FIG. 4 is a table.

DETAILED DESCRIPTION OF THE PREFERRED EMBODIMENTS

The following illustrative examples of embodiments of the invention will be described with reference to JAVA software and JAVA software Virtual Machines. However, embodiments of the invention are not limited to JAVA software programming languages or virtual machines.

A JAVA software Virtual Machine allows an embedded processing system to be abstracted out of the embedded system as far as an application programmer is concerned. However, this means that a JAVA software Virtual Machine has to take into account different aspects of an embedded processor system, such as the hardware architecture, the tool chain available for the hardware, the hardware operating system as well as the application requirements.

The integration of these four different aspects represents a significant challenge in design and implementation of a JAVA software Virtual Machine since there are many options and choices which may be taken for abstracting the different aspects of the embedded processing system, to arrive at a solution to a particular embedded processing system.

A first consideration is the hardware of the target processing device. Typically, an embedded system comprises, amongst other things, one or more core processors, a memory architecture and typically some energy aware features.

Figure 1:
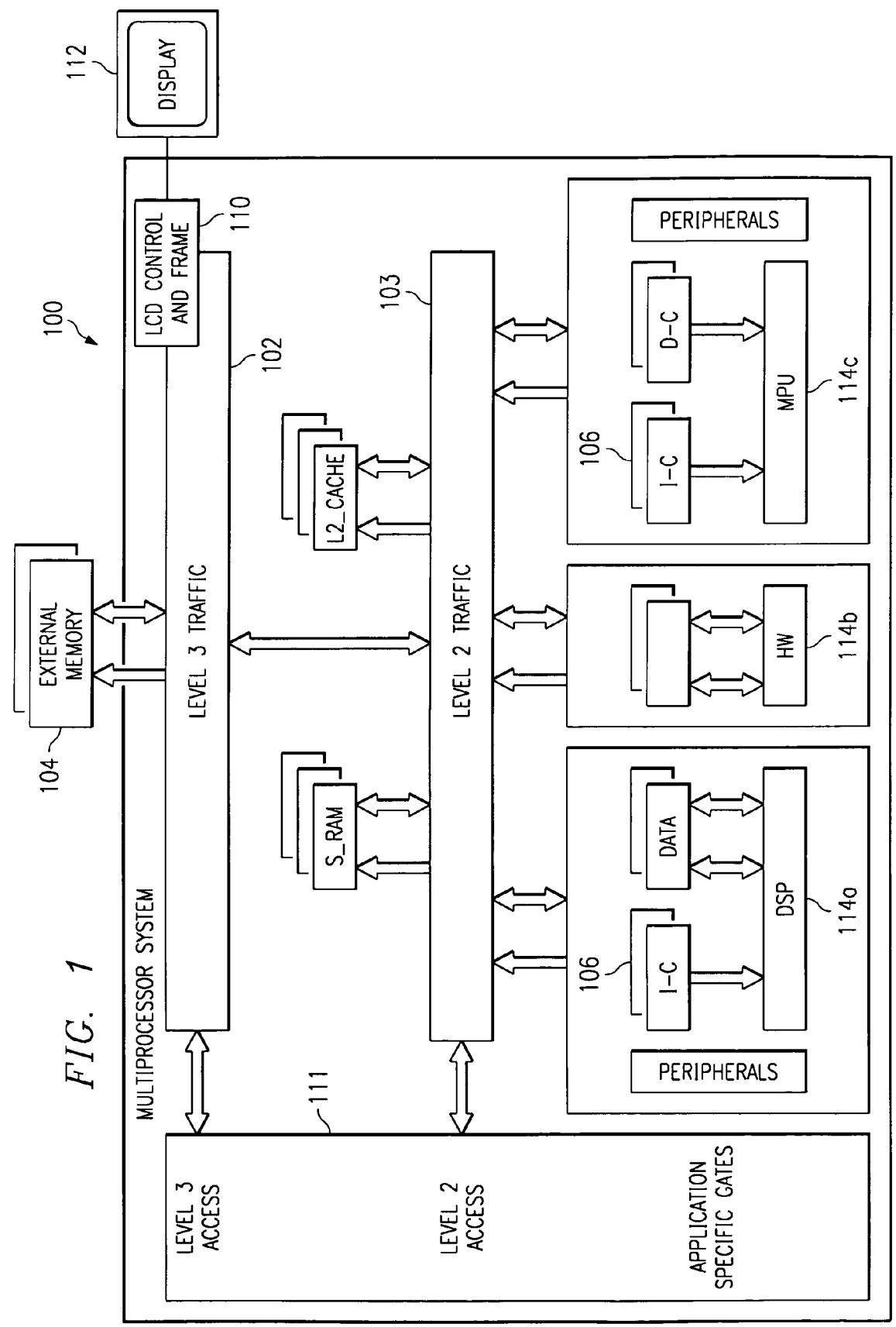
FIG. 1 is a schematic illustration of a multi-processor.

FIG. 1 illustrates an embodiment of a multi-processor system 100, suitable for providing a platform for a virtual machine in accordance with an embodiment of the present invention. The multi-processor system 100 illustrated in FIG. 1 is a simplified schematic illustration of a processor for ease of explanation. System 100 may comprise a general purpose processor, a digital signal processor (DSP), and a hardware processor optimised for providing a virtual machine platform for example. Other combinations or devices may be used. The basic elements of processor system 100 are a level 3 traffic input/output bus and interface 102 which provides an interface between external memory 104 and various functional units on the processor system 100. For example, the input/output bus and interface 102 is in communication with LCD display controller 110 and hence display 112, and a level 2 traffic bus 103. Level 3 traffic bus 102 is also in communication with access circuitry 111 for multi-processor system 100. Information from an external source such as external memory 104 is provided via interface 102 to provide processor instructions for example. Additionally, data may be provided from external memory 104 via interface 102 and over bus 103. Virtual machine instructions from the external memory 104 may be communicated over bus 102 and 103 and cached in cache unit 106 of the separate processor units 114*a*, 114*b*, 114*c*. From cache 106 instructions are loaded into an instruction buffer for input to the processor units 114.

A processor system 100, as illustrated in FIG. 1, may be embedded in a system such as for a domestic appliance or may be the central processing unit of a computer system, for example. In this regard, embodiments of the present invention are not limited to embedded processing systems, nor to multi-processor systems.

Each processor may define its own data representation capabilities, for example from 8 bits to 128 bits and possibly more in future processing devices. For efficient operation, a JAVA software Virtual Machine must be capable of manipulating byte code which is adapted for the particular data representation of the target processor. The availability of a floating point support such as 32- or 64-bit floating point in a processor may also be utilised by JAVA software Virtual Machine to implement the float or double JAVA software data types. Additionally, the registers available in a target processor may be exploited, or at least a sub-set of them, to optimise JAVA software stack performance. For example, one register can be used for the representation of the JAVA software stack pointer. Another consideration of the hardware architecture is the memory alignment issues, for example whether it is constant, proportionate to size, proportioned with threshold or some other such criterion. Additionally, the memory access cost has to be taken into account in order to efficiently arrange object fields within the JAVA software interface. Furthermore, if the embedded system comprises a multi-processor system, then the existence of homogenous or heterogeneous data representation (/ENDIAN) data size alignment has to be correctly managed in order to share JAVA software objects or internal JAVA software Virtual Machine data structures between the different processors in the multi-processor system.

An embedded system may well have many different types of memories, for example RAM, DRAM, FLASH, local RAM, which have to be taken into account as regards their particular performance characteristics. Additionally, the size of each memory has to be considered. For example, a local variable pool can be stored in local RAM whilst class files may be arranged in FLASH memory. Another consideration is that with a shared memory multi-processors, the JAVA software Virtual Machine must manage homogenous or heterogeneous address space to correctly share JAVA software objects or JAVA software Virtual Machine internal structure. The cache architecture, such as whether it has one or two levels or a particular type of flash, must also be taken into account in order to properly implement JAVA software synchronisation and the volatile attributes of an object field.

For mobile or portable applications, an important aspect of the processor system is the use by the JAVA software Virtual Machine of energy aware instruction sets such that the byte code generated for the JAVA software Virtual Machine minimise the system energy consumption.

Another aspect for consideration is that processors, or families of processors, are typically associated with a tool chain. A tool chain provides a series of functions and processes implemented in the target processor/s instruction code which may be called via a JAVA software Virtual Machine. Typically, each hardware platform makes various languages available for implementation upon it, for example C++, optimised C or assembler, which can realise optimisations about memory consumption, use of an optimised instruction set, pre-processor code optimisation and the use of register, inlining calls, 64 bit support amongst other things. Whilst it is evident that the use of a ANSI C compiler would increase the portability of an implementation, it should be borne in mind that other languages are available for hardware platforms. The particular capabilities of a compiler, as provided by their tool chain, may be implemented within a JAVA software Virtual Machine for that processor.

Another aspect which needs to be considered when developing a JAVA software Virtual Machine for a target processor/s, is the operating system that the target system runs under. Generally, an operating system has some good and some bad properties and, consequently, may be better for certain types of embedded system and not others. Particularly, operating systems tend to be designed to address a particular type of application and use. For example, POSIX operating systems such as LINUX, WIN-CE, SYMBIAN, are designed for general applications, a real-time operating system such as VX WORKS, NUCLEUS, and RTEMS are designed for real-time applications and dedicated processor kernel operating systems such as DDP BIOS SPOX, PALM OS for specific embedded applications or digital signal processing. Each of the foregoing operating systems and applications have differences which impact upon the implementation of a JAVA software application program interface. For example, to be compliant to RTSJ reference [2] a real-time operating system should be used.

A further aspect to be considered is the application requirements for processing systems. This is particularly important for an embedded system which would typically be directed to a particular type of application. As is well-known, a JAVA software application requires the use of JAVA software application program interfaces. Depending upon application needs, several application program interfaces have been defined, for example J2MF for embedded devices and J2DE for desk-top computers. A JAVA software Virtual Machine has to provide, or not, the relevant application program interfaces to support, or not, a compliant application. Additionally, new processor devices can be masked through application program interfaces and, therefore, a JAVA software Virtual Machine needs to be able to deal with low-level implementations of the devices. An example would be a JAVA software Virtual Machine supporting a blue tooth communications network protocol for which an appropriate application program interface would have to be defined. Application program interfaces are not necessarily the sole preserve of the application programmer, but may well be the result of standard specifications such as may be derived by a JAVA software community process group.

Figures 2, 5:
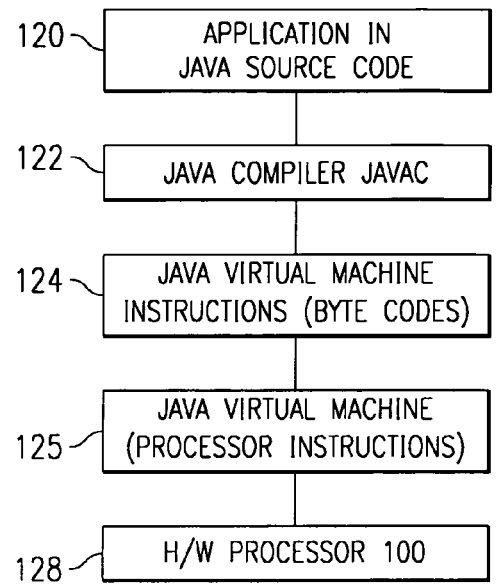
FIG. 2 is a flow diagram illustrating the process for implementing an application using a JAVA virtual machine.
FIG. 5 is a table.

FIG. 2 illustrates the process flow for implementing an application using a JAVA software Virtual Machine. The process starts at step 120 where an application in JAVA software source code is developed and written. That application source code is compiled in a JAVA compiler at step 122 which converts the application source code into an architecture neutral object file format thereby encoding a compiled instruction sequence at step 124, in accordance with the JAVA software Virtual Machine specification. The compiled instruction sequence at step 124 consists of a plurality of byte codes. The byte codes are executed by the JAVA software Virtual Machine at step 125, which translates the byte codes into processor instructions for implementation on processor 100 at step 128.

As discussed above, a large number of criteria have to be taken into account when designing a JAVA software Virtual Machine for embedded processing systems. The design of a JAVA software Virtual Machine is complex, particularly if certain goals are to be achieved. Namely, those goals are to minimise the importing cost of the JAVA software Virtual Machine onto a new embedded processing system; to obtain the best trade off between application needs, embedded system processing constraints and embedded system features; and to adapt the JAVA software Virtual Machine to features of new hardware and new applications.

The present applicant has addressed the problems and difficulties encountered in developing JAVA software Virtual Machines to meet the foregoing design criteria by developing a modular JAVA software Virtual Machine architecture. The term "modular" means at least two associated things. Firstly, it refers to a specification of all individual different software parts for a JAVA software Virtual Machine and, secondly, a way to agglomerate these many parts, written in separate languages, with maximum transparency in order to provide a modularized environment for generating a modular JAVA software virtual machine. Additionally, the applicant has invented an architecture in which it is possible to transparently access a particular module from other modules. Consequently, the architecture provides for the investigation of several implementation choices for a module for one specific embedded system by testing the implementation system with regard to other modules and best design choice. The choice of implementation may be done in accordance with different features of the embedded system such as its hardware architecture, its tool chain, operating system and application requirements.

By designing and implementing a modular JAVA software Virtual Machine, the JAVA software Virtual Machine may be implemented for a particular embedded system. And the trade-off between the various attributes of the system can be optimised for the particular target processors and application.

Figure 3:
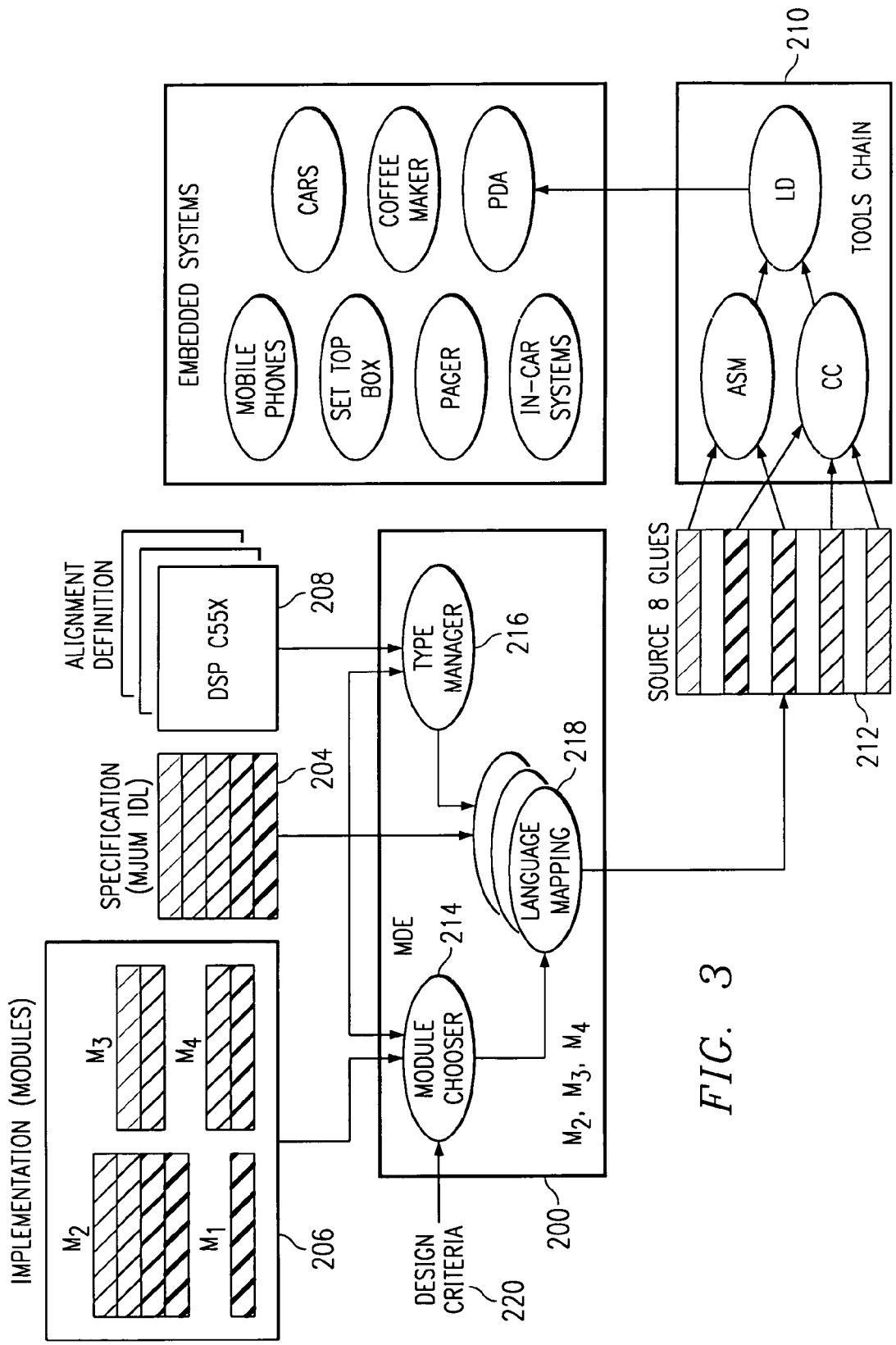
FIG. 3 is a schematic illustration of a development environment in accordance with an aspect of the invention.

Referring now to FIG. 3, there is illustrated an example of a development environment such as may be provided by a software tool, for developing a modular JAVA software Virtual Machine (MDE). The MDE 200 provides a series of tools to support the modular design of a JAVA software Virtual Machine. Three inputs are sent to the MDE in order to generate the sources and glues. First, an interface definition language (IDL) specification 204 which describes declarations of JAVA software Virtual Machine services and types utilising a processor independent language is input. Additionally, various program code modules containing implementations of JAVA software Virtual Machine services and types for one of a number of languages which can be run on target processors can be input. Finally, alignment definitions 208 describing the alignment constraints for different target processors, together with their respective access costs are also input to MDE 200.

A tool chain 210 compiles sources and glues 212 to generate program code to form a JAVA software Virtual Machine suitable for the processing device or specific embedded system for which the JAVA software Virtual Machine is targeted. The tool chain 210 generates a JAVA software virtual machine for each processor of a multi-processor system. Each JAVA software virtual machine comprises its own modules, and preferably does not share modules with other JAVA software virtual machines. In this regard, each JAVA software virtual machine is independent of the other. The choice of modules for each JAVA software virtual machine depends on the design criteria input 220.

Describing the specification for the modular JAVA software Virtual Machine interface definition language 204 in more detail, the IDL describes services and data types independently of the language implementation of the JAVA software Virtual Machine. The service comprises a function name with a return type and all data types used for that service and the direction of its parameters. The type itself is composed of other types or structured types such as structures, unions and arrays, with services to create and free instances of the type and parameters to initialise such instances.

The implementation modules, 206, each comprise service or type implementations having common or shared implementation characteristics or knowledge. When a particular module M1, M2, M3 or M4 is selected to be part of the JAVA software Virtual Machine, all services and type implementations inside the selected module are also selected. A scheduler module is also included as part of the implementation modules 206. The scheduler module undertakes load balancing to determine whether a task is mapped to a particular one or other of a plurality of processing devices in an embedding system, e.g. DSP or MPU.

A module, M1, M2, M3 or M4, may fully or partially implement the service, as well as supplying pre/post hooks and wrappers as described hereinafter.

Pre-hooks are functions executed just before functions which implement a service. Prepare functions have to return all module agree or not on the executed service. Whereas commit functions execute only if all prepare functions from all module agree to execute the service. If not, then abort functions are executed.

Post-hooks are functions which are executed just after functions to implement the service. Post functions are executed only if the function that implements the service does not return an error. If an error is returned, then error functions are executed.

Wrappers are functions which are executed in place of a service. It is the wrappers' responsibility of calling the original service, if desired, and also to modify parameters and return values for the service.

A module can add a private part to any type defined for it, as well as initialisation and destruction functions. A private part could be an opaque type such as a memory area which is only managed by the module, another defined type or a structural type with a fixed or variable size.

The modular development environment 200 comprises three main components: the module chooser 214, the type manager 216 and several language mappings 218. In order to be able to generate different aspects or versions of a JAVA software Virtual Machine for different target host processors within a multi-processor system, several different modules are configured to implement the same services and types, yet for different processor languages. In this case, each module is described by a set of keywords. The module chooser 214 selects from the plurality of modules M1, M2, M3 and M4 the most accurate one or ones for a specific embedded processing system in accordance with design criteria 220 input thereto. The design criteria comprises a list of weighted keywords.

The role of the type manager 216 is to merge different parts of a type, whether global or private, to a module and to generate offset of its different components according to alignment constraints on one or several target processors as input from alignment definition 208. Language mapping module 218 provides different language mapping for generating sources and glues. The language mapping to generate sources and glues is performed off-line and therefore there is no overhead in managing services, hooks, wrappers and fixed size types.

In an illustrative implementation, the MDE 200 comprises two parts which read the specification IDL and implementation description files. In addition, there is the module chooser for receiving inputs in respect of design criteria, specification interface definition language criteria and implementation modules. Two type managers are provided. The first one handles only alignment constraints for mono- and multi-processors. The other type manager is configured to aggressively minimise memory consumption. Optionally, a third type manager may be included configured to tune a trade-off between memory consumption and access cost.

In the illustrated embodiment, language mapping module 218 comprises two language mappings. One for GNU-C and GNU-tool chains. The other is for Texas Instruments C and its corresponding tool chain. It will be evident to a person of ordinary skill in the art further language mapping elements may be included to integrate other assembler languages.

Each module of the JAVA software virtual machine may be of a so-called open design. Examples of module design addressing the four different points described above in relation to hardware through to application requirements will now be described. Extensions to module designs are described for each point.

An individual module design could be configured to compensate for lack of features of a particular target processor, or to optimise an implementation or to exploit features supported by the hardware. For example, since there is no direct use of compiler basic types it is possible to implement missing types, for example implement 64-bit integer support, for a hardware where such type are not supported. Additionally, structures are not managed by the compiler, but the MDE. Therefore, well aligned structures compatible with several core target processors may be generated, as well as the rearrangement of the structure organisation to minimise memory consumption. The trade-off between memory consumption and access cost may also be managed. For example, due to the high frequency of object structure access, the access cost objects is very important to optimise.

A software tool in accordance with an embodiment of the invention can be utilised by an implementer to write special modules to efficiently use a hardware's potential for a target processor. For example, a dedicated stack module could use a local double access memory or chip to optimise the performance of the energy consumption of the JAVA software virtual machine.

Adding a new tool chain may be achieved by adding a new language mapping in the MDE. Thus, new language support may be added, for example an assembler for a specific target processor, or the JAVA software language itself in connection with a native interface support. Similarly, it can be possible to exploit or compensate for a tool chain or compiler features, e.g. lining support.

Operating system compatibility is derived from the specification of services for operating system functionalities. An implementation of these services is operating system dependent, and therefore has to be re-written for each incompatible operating system application programme interface. For example, there could be a POSIX module, as well as a VXWORKS or a DSP BIOS [3] which implements operating systems services by directly using OS application programme interfaces or compensates for a lack of OS functionalities for implementing them.

With regard to software requirements, the modular approach permits a module to add JAVA software virtual machine functionality or native methods to respective application requirements by implementing, completing, tracking or intercepting all services or types. For example, a module could implement services and types to provide a class loader. Optionally, a module could complete a type. For example, a thread module could add a private mutax on object type and class type without modifying other modules which use these types. Hooks can be added on any service, so that for example a benchmark/profile/debug module could trace every service in the JAVA software virtual machine.

Any service may be intercepted, for example a module could intercept the class access service to add multiprocessing by cloning static fields and monitors of classes as described in reference [4]. Since the specification of the JAVA software platform is subject to evolution, for example a JAVA software virtual machine compliant with CLDC specification has to be CDC compliant (class load support, floating support, byte code verifier support, etc.), new or extensions of a JAVA software virtual machine specification can significantly change the design of several elements of the JAVA software virtual machines. The initial effort for obtaining a JAVA software virtual machine for a first target is significant since the first decomposition of the modules is non trivial and the initial design can take a long time. However, once this effort has been expended, then further advantage may be taken of the modularity decomposition in order to generate JAVA software virtual machines for further target processors.

Embodiments in accordance with the present invention for developing and providing a JAVA software virtual machine require the use of several tools, and are limited in respect of the coding restrictions in the implementation of module services. Advantageously, new tools may be developed in order to improve the implementation of modules.

The integration of hardware and software for the design of respective modules requires strong skills both in hardware design, especially on an analysis of the side effects introduced by a treatment on architecture, in tool chains (it is necessary to support a new language, or to adapt MDE tool according to a language facility), in the operating system (in order to manage the JAVA software virtual machine efficiently through the operating system by choosing the best facilities available) and algorithmically for op code realisation. The foregoing challenges exist for other non-modular JAVA virtual machines. Embodiments in accordance with the present invention, differ from conventional JAVA software module machines and their design in that it provides the possibility for the designer to exploit their skills in order to determine the best trade-off for the JAVA software virtual machine, to run on a multiprocessor system environment or optionally on a single processor.

An embodiment in accordance with the present invention comprises a JAVA software virtual machine designed using a modular approach.

In a preferred embodiment, the JAVA software virtual machine is decomposed in several modules classified in six categories as illustrated in Table 1 of FIG. 4. The six categories are arithmetic, JAVA software frame, control flow, object, class and miscellaneous. Each module is given a name indicative of the function that it is performed. For example, the module which handles the representation, operations, and conversion of JAVA software integers, is termed "integer". In a particular embodiment, the hardware supported is a PENTIUM 32 bit core processor family. Additionally, the Texas Instruments DSPc55x family, which is a 16 bit word addressable processor, is also supported. In the preferred embodiment, most modules are written in ANSI C compiler, a few are written with the GNU C features and TI DSP: C55x. Modules may also be implemented in PENTIUM and DSP assembly language, and also in DSP optimised C compiler for increasing the efficiency of bit code execution.

A third embodiment supports operating systems such as a POSIX general operating system (LINUX, WINDOWS PROFESSIONAL/98/2000) but also a real time operating system with POSIX compatibility (VXWORKS). Optionally, each module may be adapted depending on VXWORKS features, leaving the POSIX compatibility for that case.

From the application point of view, the CLDC specification is supported. Additionally, floating point operations are supported as well as authorised class load execution in order to permit the downloading of applications via a network for example. Consequently, the preferred embodiment may be considered to be closer to CDC than CLDC.

There will now be described an implementation for a target processor from a commonly used family in embedded systems, i.e. the C55x from the Texas Instruments DSP.

A DSP is a dedicated processor for a digital signal processing. In spite of its limitation when used as a general microprocessor, its large usage in embedded systems and also some interesting features means that the running of a partial or a full JAVA software virtual machine on such a hardware platform is not a meaningless proposal. In the following section the hardware features of the TI C55x family, and its tool chain characteristics in operating systems are briefly described. Further details may be found from reference [3].

The low power C55x family of Texas Instruments have up to six address buses, one programme bus and five data buses allowing one 32-bit programme read, three 16-bit data read and two 16-bit data write buses for simultaneous operations during one cycle. The status base is only word addressable. There are some 59 registers from 7-bit to 40-bit, a 40-bit ALU and barrel shifter, and a multiply/accumulate unit. Finally, there is a local single or double access memory on chip.

The C55x family of processors is composed of a pre-processor, a ANSI C compiler, a C optimiser, an assembler and a linker. The ANSI C compiler has a limited C/assembler mixed support, in lining support, and 32-bits IEEE floating points support. The ANSI C compiler also has uncommon data types since it manages characters of 16-bits, with long characters of 40-bits, function pointers of 24-bits, and data pointers of 16 bits (small memory model) or 23-bits (large memory model).

A very basic operating system is available on the TI C55x. It is a system that permits interrupt management, inputs/outputs from/2 the chip set, and also offers the abstraction of task and permits the use of pre-emptive fix scheduling with a few number of tasks. No abstraction of address space is provided and few library calls are supported. This operating system is very small and is adapted to the TI DSP C55x instruction set.

In the preferred embodiment, the interpretation engine of the illustrative JAVA software virtual machine is referred to as a motor module. The motor module is in charge of decoding the byte code in order to call the appropriate function to perform the op code operation associated with the byte code. In a first implementation, a classical loop is used to fetch one op code, to decode it with a C switch statement (or similar statement for another implementation language) and to branch to the right piece of code. In a second implementation, so-called threaded code, reference [5], is used to translate, prior to execution, the original byte code by sequence of addresses which point directly to op code implementation. At the end of each code implementation, a branch to the next address is performed and so on. Such an implementation avoids the decoding phase of the switch solution described above, but causes an increase or expansion in the amount of codes.

The Applicants have conducted experiments with regard to the two implementations described above for the motor modules. In the first experiment, a switched motor module was coded with ANSI C; whilst for the second implementation a threaded motor module was implemented with GNU C (although this implementation requires the GNU C's label as values feature). These two implementations of the motor module were run on the well-known CISC 32-bit Intel Pentium II processor. Secondly, the two implementations were run on a TI DSP C55x processor for which motor was merely compiled and switched. Due to the absence of GNU C features on the TI tool chain, assembler statements were added to achieve a threaded motor.

Table 2 illustrated in FIG. 5 summarises the number of cycles used to execute one loop of a JAVA class-file to compute fibonacci numbers and the number of memory bits to store the byte code (translated or not).

With the Intel Pentium II, the threaded motor saves 19% of cycles, whereas for the TI DSP C55x, its saves 62% of cycles. This difference in speed is very important, since there is more than three times the saving for the TI DSP C55x. On the other hand, the Pentium II has a memory overload of 400% between the threaded motor and the switch motor because, in the first case, one op code is represented by one byte, and in the latter case, with four bytes (one pointer). But on the TI DSP C55x the memory overhead is only 200% because of the representation of one op code with two bytes due to the 16-bit character type. A modified switch motor without memory overhead (labelled as switch 2) which takes the high or low byte of one word depending on the programme counter parity, takes more than twice the number of cycles of a classic switched motor.

As can be clearly illustrated by the foregoing, the gain obtained by an optimisation for one particular processor is not necessary the same as the other. Therefore, it is optimistic to believe that optimisation can be achieved in a completely portable code. Thus, compiling a portable source of a JAVA software virtual machine without fully understanding the target processor or processors could result in poor performance or unwitting and undesired memory expansion.

An advantage of the modular approach described herein is that it allows several implementations of the same module to be provided for experimentation with different strategies on different target processors, or to focus on one particular module among existing generic portable modules.

Although two specific processor families have been referred to in describing implementation of the invention, namely the Pentium II processor and the TI DSP C55x family of processors, it will be readily apparent to the person of ordinary skill from the preceding general description that the teaching may be applied to other processors, for example shared memory multiprocessor or architectures.

Embodiments of the invention provide an easy way to add modules between two other ones transparently. Moreover, modules may be easily adapted to JAVA software virtual machines for embedded systems, such that the JAVA software virtual machine can be adapted to new features depending upon the application requirement. This permits the taking into account of hardware and software evolution. As an example, the management of multimedia applications taking into account energy consumption may be included as a module or modules within embodiments of the invention, reference [8]. Moreover, the reusability of existing module implementation limits the adaptation of few modules only on a new embedded system and that reduces development cost. Finally, the independence between modules increases its ability of overall JAVA software virtual machine, and also the maintenance cost of the JAVA software virtual machine software.

In view of the foregoing description it will be evident to a person skilled in the art that various modifications may be made within the scope of the invention.

Evidently, further modules may be designed and provided for implementation in accordance with the present invention.

Insofar as embodiments of the invention described above are implementable, at least in part, using a software-controlled programmable processing device such as a Digital Signal Processor, microprocessor, other processing devices, data processing apparatus or computer system, it will be appreciated that a computer program for configuring a programmable device, apparatus or system to implement the foregoing described methods is envisaged as an aspect of the present invention. The computer program may be embodied as source code and undergo compilation for implementation on a processing device, apparatus or system, or may be embodied as object code, for example. The skilled person would readily understand that the term computer in its most general sense encompasses programmable devices such as referred to above, and data processing apparatus and computer systems.

Suitably, the computer program is stored on a carrier medium in machine or device readable form, for example in solid-state memory or magnetic memory such as disc or tape and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A method for generating in an apparatus program source code for translating high level code into instructions for a target processor, the method comprising:
   determining a program code characteristic corresponding to said target processor;
   deriving one or more program code modules in accordance with said program code characteristic; and
   generating program source code for translating high level code into instructions for said target processor from said one or more program code modules.

2. A method according to claim 1, for generating program source code for translating high level code into instructions for one of a plurality of target processors.

3. A method according to claim 1, comprising forming agglomerated program source code from a plurality of program code modules in accordance with said program code characteristic.

4. A method according to claim 1, further comprising deriving said program code modules in accordance with a desired functionality for said target processor.

5. A method according to claim 2, wherein:
   said step of determining comprises determining respective program code characteristics for respective ones of a plurality of target processors;
   said step of deriving comprises deriving respective program code modules in accordance with said respective program code characteristics; and
   said step of generating comprises generating program source code for translating high level code into instructions for said target processors from said program code modules.

6. A method according to claim 1, wherein said step of deriving comprises selecting one or more pre-defined program code modules in accordance with said program code characteristic from a plurality of available program code modules.

7. A method according to claim 1, wherein said program code provides a virtual machine for said target processor.

8. A method according to claim 1, wherein said program code comprises elements of a programming language.

9. A method for creating in an apparatus program source code for translating between high level code and instructions for a target processor, comprising the steps of:
   determining a program code characteristic corresponding to said target processor;
   selecting one or more predefined program code modules in accordance with said program code characteristic; and
   forming program source code for translating high level code into instructions for said target processor from said selected one or more predefined program code modules.

10. A method according to claim 9, wherein said creating program source code for translating between high level code and instructions is for one of a plurality of target processors.

11. A data processing apparatus for creating program source code for translating between high level code and instructions for a target processor, the data processing apparatus being configured to:
   determine a program code characteristic corresponding to said target processor identifier input to said data processing apparatus;
   derive one or more program code modules in accordance with said program code characteristic; and
   create program source code for translating high level code into instructions for said target processor from said derived one or more program code modules.

12. The data processing apparatus according to claim 11, further configured for creating program source code for translating between high level code and instructions for one of a plurality of target processors.

13. An apparatus, comprising at least one program source code module of a plurality of program source code modules for translating between high level code and instructions for a target processor, said at least one program code module corresponding to a characteristic of said target processor and being selected from said plurality of program source code modules.

14. The apparatus of claim 13, further comprising at least one additional program code module for translating between high level code and instructions for respective ones of at least two target processors.

15. The apparatus according to claim 14, wherein said at least two program code modules are selected from a plurality of predefined program code modules.

16. The apparatus according to claim 13, wherein said program source code provides a virtual machine for said target processor.

17. The apparatus according to claim 14, wherein said program source code provides a virtual machine for said target processor or processors.

18. The apparatus according to claim 13, wherein said program source code comprises elements of a programming language.

19. The apparatus according to claim 14, wherein said program source code comprises elements of a programming language.

20. A processor, configured in accordance with program code comprising at least one program source code module of a plurality of program source code modules, for translating between high level code and instructions for a target processor, said at least one program source code module being in accordance with a characteristic of said target processor and selected from said plurality of program source code modules.

21. A processor, configured by program code comprising an agglomeration of two or more program source code modules of said plurality of program source code modules.

22. A system comprising a first and second processor, said first and second processor configured in accordance with program code comprising at least two program source code modules, wherein the first of said at least two program source code modules is arranged to translate high level code to instructions for said first processor and a second of said at least two program source code modules is arranged to translate high level code to instructions for said second processor.

* * * * *